Figure 1:
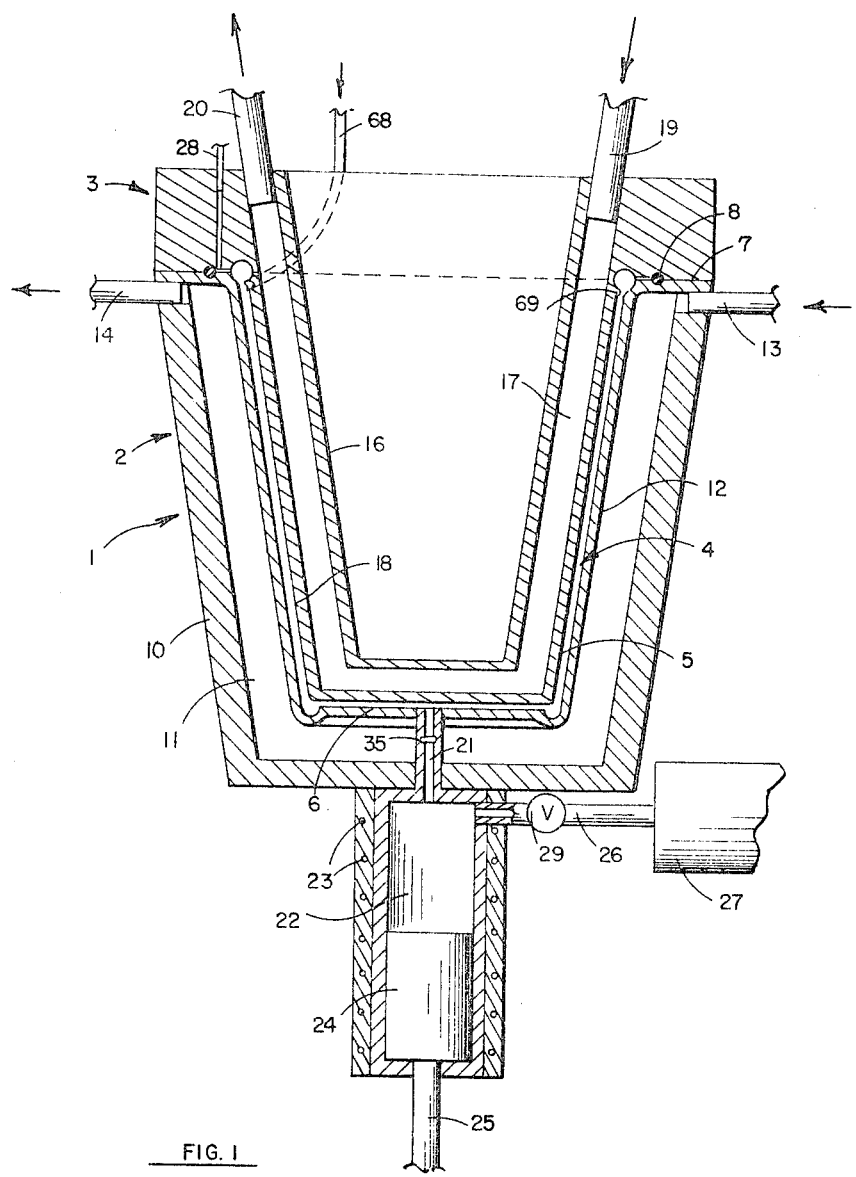

INVENTORS
ROBERT A. KRAUS
EDMUND J. KRAUS

INVENTORS
ROBERT A. KRAUS
EDMUND J. KRAUS

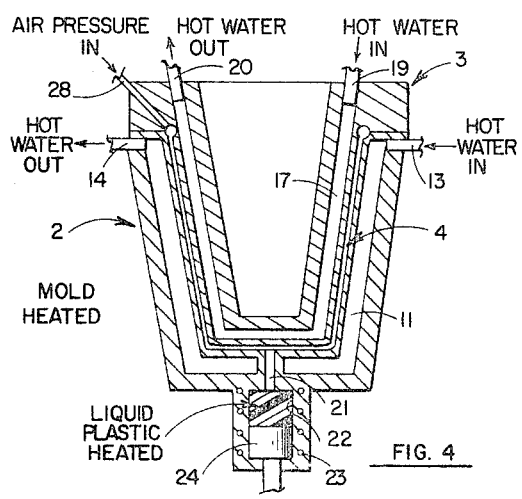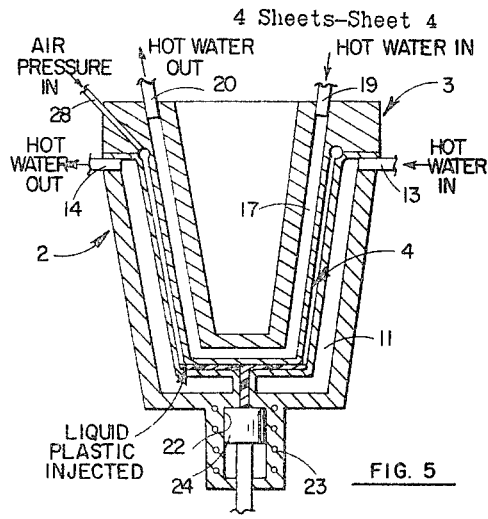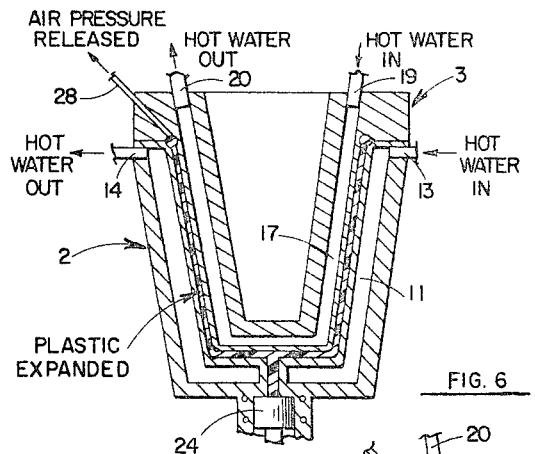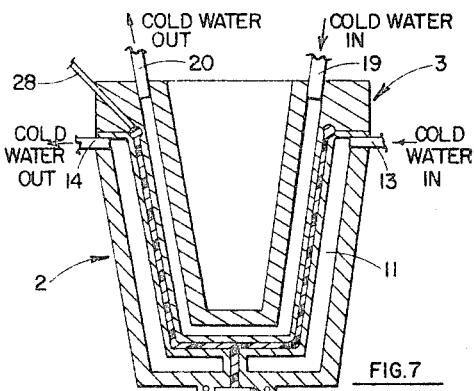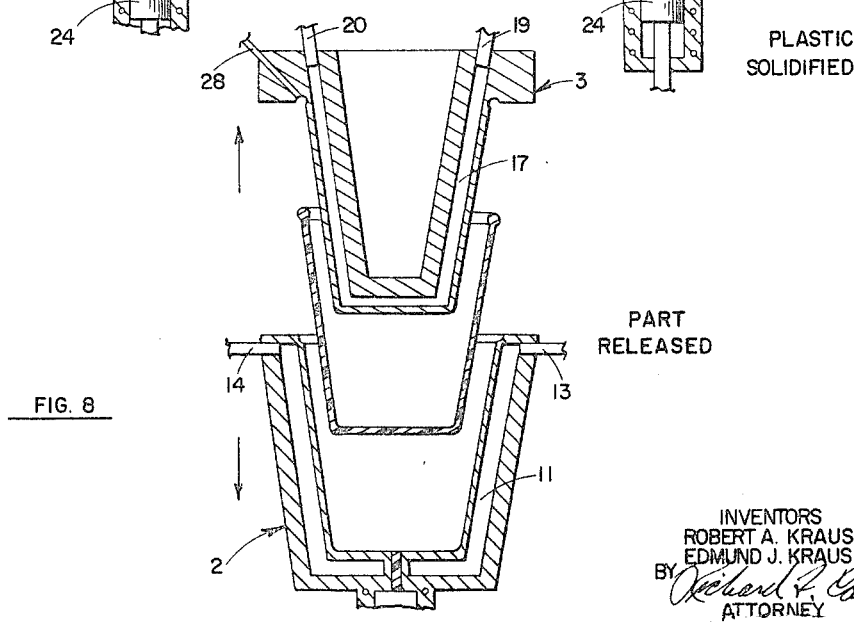

United States Patent Office 3,268,635
Patented August 23, 1966

3,268,635
ARRANGEMENT FOR FORMING FOAM
PLASTIC ARTICLE
Robert A. Kraus and Edmund J. Kraus, both of
1117 Mayflower, Monrovia, Calif.
Filed Feb. 25, 1963, Ser. No. 260,750
16 Claims. (Cl. 264—41)

This invention pertains to the forming of foam plastic products, particularly to the forming of thin-walled articles such as containers.

At the present time there is an increasingly large production of disposable cups of expanded fused foam plastic pellet material. These cups have numerous advantages, one being their extremely low thermal conductivity which makes them ideal for hot or cold beverages. Also, they are nonabsorbent and tasteless. While these cups are basically expendable in nature, nevertheless, the business is competitive and cost is a problem. One factor leading to expense in the manufacture of the foam plastic cups is the relatively high cost of the pellets used in making up the cups. These pellets, which are charged with the gas to cause their expansion when subjected to heat, can be stored for only a relatively short period of time. If kept too long before use, their ability to expand is lost. Perhaps even more serious are the difficulties encountered in handling and molding the plastic beads to form the completed item. The beads must pass through narrow passageways on their way to and in the mold where they are fused together. The pellets have a tendency to plug up such openings resulting in the malfunctioning of the machinery. Hence, equipment for cup manufacture has been complex in nature, costly to construct and maintain. Prior to entering the molding machine the pellets must be pre-expanded to an exact size. It is difficult to control this pre-expansion properly, and pellets too large or too small frequently are directed to the mold inadvertently. Inherent in forming articles from fused foam pellets is the loss of beads of improper dimension that are sorted out before and after the pre-expansion process. Thus, it is never possible for the manufacturer to utilize all of the material he has purchased.

Not only have the difficulties in manufacture led to added expense, but they have resulted in a product that does not always meet acceptable quality standards. All too often leaks will be present where the pellets are not fully joined together. In some instances the product is brittle, and will shatter if squeezed by the user. Also, the plastic pellets cannot safely be given any coloration, so that distinctive and attractive hues cannot be given to the products formed.

As a result of these considerations the production of such articles by foaming of the plastic material directly in the mold, rather than in initially forming beads to be fused subsequently, would offer attractive possibilities. In the first place, this would permit the use of cheaper material. Also, the foaming agent could be added to the material immediately prior to its use so that the material would not deteriorate over a period of time. There would be no problem of storing overage material, and even greater economies could result from obtaining larger quantities of the plastic with each order. Moreover, all the problems of handling, expanding and fusing the plastic pellets would be obviated. This would result in a superior product, while simplifying the equipment and reducing maintenance expense for the machinery.

However, in the past it has been impractical to attempt to produce a foam plastic thin-walled article by foaming in the mold. Such material cannot be injected satisfactorily into the mold when using conventional techniques. The expanding nature of the material as the foaming takes place offers resistance to any effort to force the plastic into the mold cavity. Premature solidification of the plastic will take place. Consequently, it has been impossible to fill the mold cavity so as to secure a completed foamed plastic article, and instead only a small section of the intended product has been obtainable. As a result, heretofore thin-walled articles have all been made from the fused foamed beads, and there has been no commercial production of such items foamed from the liquid in the mold.

The present invention, however, provides a relatively simple arrangement whereby it is possible to foam the plastic material directly in the mold. It permits the realization of all the advantages of such a procedure, yet without the difficulties of injection and filling of the mold as previously encountered. This results from injecting the unfoamed plastic into a heated mold under pressure. This plastic may have received any desired coloration with no adverse effects on the resulting product. The pressure is maintained within the mold cavity above the unfoamed plastic, and is greater than that of the propellant so that the foaming reaction is prevented. This pressure then is released which allows the foam plastic to expand evenly throughout the mold cavity. The mold then is cooled to solidify the plastic article and the operation is complete. The result is a perfect thin-walled plastic article having a different cell structure from products made of fused pellets. The product is unitary and uniform, having no possible leaks as can occur where plastic beads are not joined properly in the fusion process of the prior art. This is made possible only through the injection of the foamable material into the mold where it is kept from expansion until the pressure in the mold is released.

Accordingly, it is an object of this invention to provide for the manufacture of thin-walled items of foam plastic material.

Another object of this invention is to manufacture low cost, expendable foam plastic items.

A further object of this invention is to provide for the manufacture of thin-walled foam plastic articles of unitary construction and without the use of fused expanded beads.

An additional object of this invention is to manufacture thin-walled foam plastic items rapidly with relatively low cost equipment that is easily maintained.

Yet another object of this invention is to manufacture thin-walled foam plastic items of superior quality and appearance.

Figure 2:
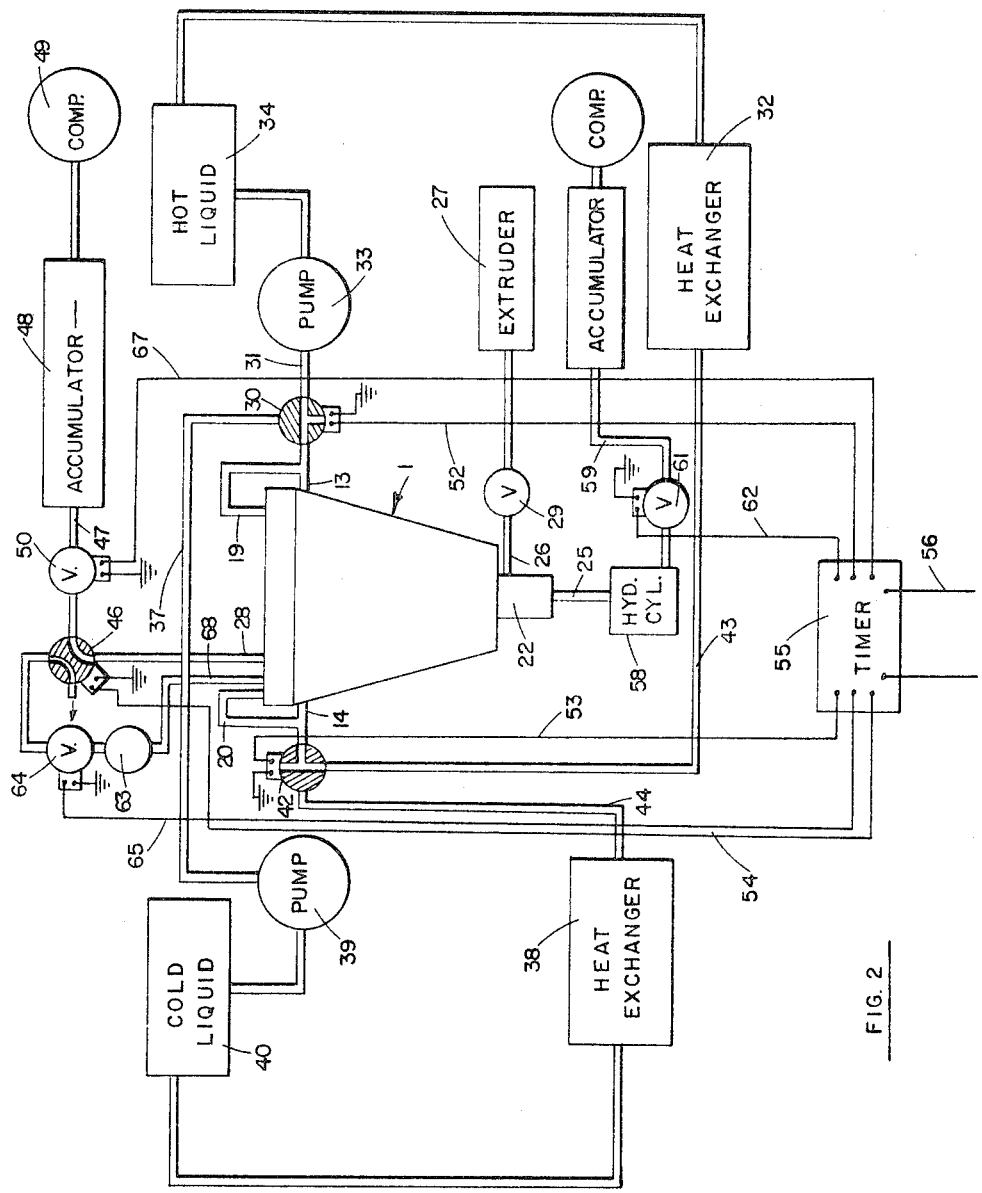
Figure 3:
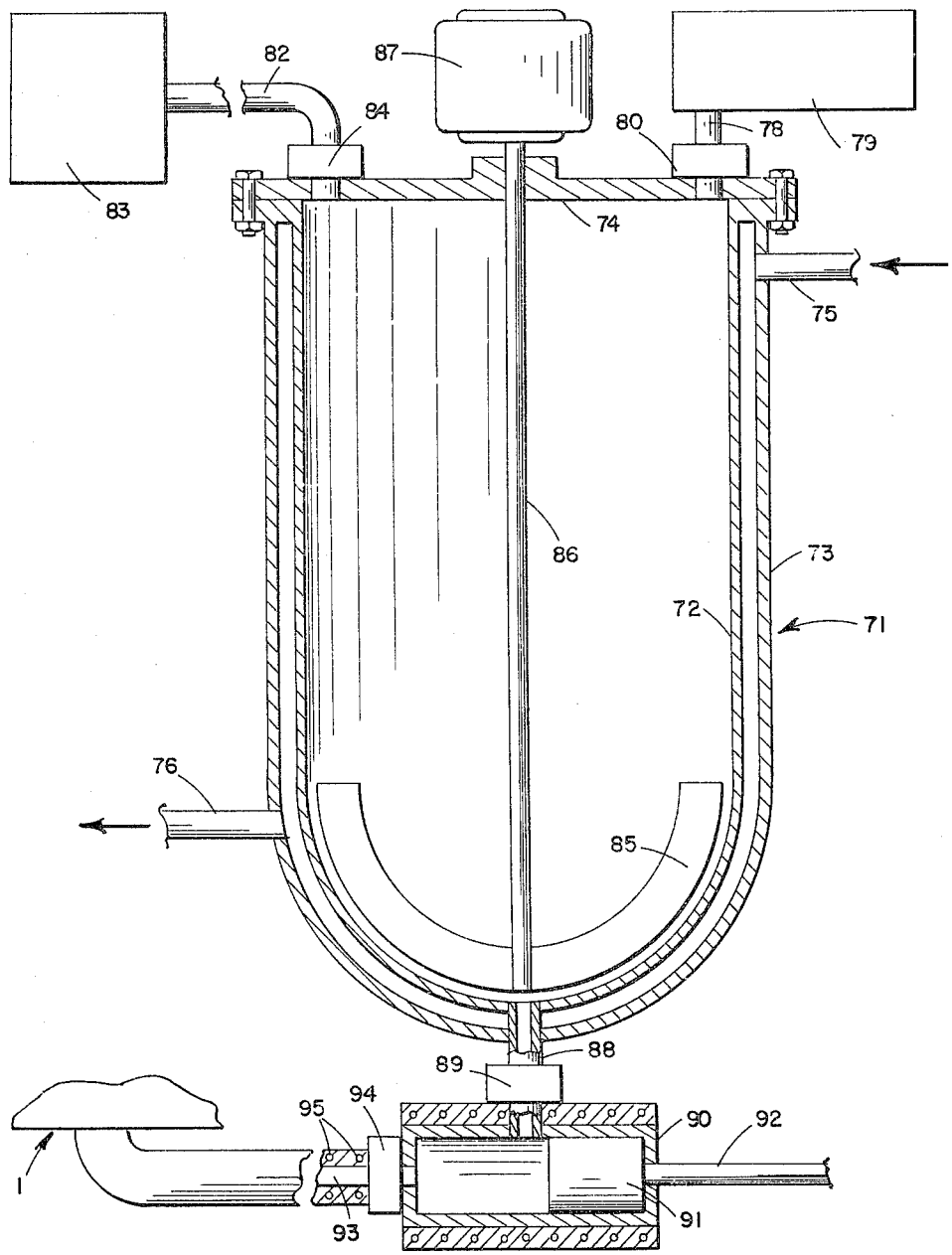

These and other objects will become apparent from the following detailed description taken in connection with the accompanying drawing in which:

FIG. 1 is a longitudinal sectional view of the mold assembly used in this invention, FIG. 2 is a schematic view of the overall system for forming foam plastic articles, FIG. 3 is a longitudinal sectional view of an alternate arrangement for heating and injecting the plastic, FIG. 4 is a schematic view illustrating the initial step where the mold is heated as the plastic is liquefied and ready for injection, FIG. 5 schematically illustrates the next step where the liquid plastic is injected into the mold cavity and kept from foaming by the application of fluid pressure to its surface, FIG. 6 illustrates the foaming of the plastic to fill the cavity upon release of the pressure within the cavity, FIG. 7 shows the cooling of the plastic in the cavity by the circulation of cold water around the mold to solidify the plastic, and FIG. 8 illustrates the release of the completed part from the mold.

With reference to the drawing, there may be seen in FIG. 1 a mold asembly 1 intended for the manufacture of a thin-walled item such as a cup. The mold is made up of a female section 2 and a male portion 3. The mold surfaces are contoured to define a cavity 4 which in the design illustrated constitutes the outline of a cup. In this connection it may be noted that the cavity includes a relatively thin substantially frustoconical side portion 5 extending upwardly and diverging outwardly from the radial bottom portion 6. The male and female mold portions meet at a parting line 7 where a suitable annular seal 8 is provided. It should be understood that the mold portions 2 and 3 may be separated axially in the usual manner to a position where they are remote from each other and the cavity 4 is opened up.

The female mold portion 2 is provided with an exterior jacket 10 defining an open passageway 11 around the exterior wall 12 of the mold. This is for the purpose of transmitting a fluid around the exterior of the mold, which may enter the passageway 11 through inlet 13. An outlet 14 provides egress so that the fluid may circulate entirely around the exterior of the mold.

Similarly, there is a jacket 16 at the interior of the male section of the mold, defining a passageway 17 around the inner wall 18 of the mold assembly. Fluid may circulate through the passageway 17, entering through inlet 19 and leaving through outlet 20.

During the forming cycle liquid plastic is suitably introduced into the mold cavity 4. One arrangement for bringing the plastic into the mold includes an injection tube 21 which communicates with the center of the bottom portion 6 of the mold cavity 4. Outside of the mold, tube 21 connects to the end wall of a small cylinder 22. The cylinder is heated by suitable means such as by circulating fluid around its exterior or by the electrical resistance heater 23 illustrated. An elongated piston 24 is reciprocative in this cylinder and may be actuated by means of a rod 25 extending through the opposite end of the cylinder 22. An inlet conduit 26 connects to the cylinder 22 above the piston 24. This line is supplied from an extruder 27 for introducing plastic material into the cylinder.

This extruder may be of conventional construction, including a feed screw arrangment where granules of the plastic are ground into small particles and advanced toward cylinder 22. In the extruder a high frictional heat is generated, which may be supplemented by an additional source of heat. The result is that the plastic is liquified prior to introduction into cylinder 22. Also at the extruder the expansion agent for the plastic is mixed with it. Various substances such as methylchloride, butane or heptane may be used as the gaseous ingredient to cause the foaming. Particularly suitable is isobutane. The foaming agent may be admitted to the extruder in a pressurized liquid form. The plastic for constructing the thin-walled article in the mold usually will be polystyrene. If desired, a pigment also may be added in the extruder, becoming thoroughly mixed with the plastic to impart a color to the completed article.

An additional connection to the mold cavity 4 is provided by a small conduit 28 that communicates with the mold at a location remote from the injection tube 21. Preferably, the end of the line 28 is at the parting line of the mold sections, inwardly of annular seal 8. A clearance of around .002 to .005 inch is provided at this portion of the parting line, so that line 28 has open communication with the mold cavity.

In operation of the device, initially a quantity of the liquid plastic material enters the cylinder 22 through the line 26, passing through check valve 29 as it is moved into the cylinder. The liquid plastic may be polystyrene material heated in the extruder to a range of approximately 300° F. to 400° F. It will contain a foaming agent such as isobutane capable of reacting to greatly extend its volume. The cylinder 22, which is heated to the same general temperature range, is of predetermined volume based upon the size of the article to be produced in the mold. For example, if it is known that three grams of material are needed in forming a cup in the mold cavity 4, the cylinder 22 will be of a volume which will admit three grams of the heated plastic. The volume of cylinder 22 is less than that of mold cavity 4 so that initially the liquid plastic from the cylinder will only partially fill the mold when subsequently forced into the cavity.

With the cylinder the 22 full, the piston 24 is advanced through its stroke by pushing inwardly on the rod 25. This injects the plastic through tube 21 into the lower portion of the mold cavity 4. The piston 24 closes off the inlet line 26 to the cylinder as it advances to its alternate position.

At the time of the injection the mold cavity is under fluid pressure from the line 28. The pressure is retained in the mold by virtue of seal 8 at the parting line 7. This pressure is correlated with the temperature of the plastic and the nature of its foaming agent. The purpose of this pressure is to preclude foaming of the plastic until such time as the injection of it is complete. Thus, the pressure within the mold prevents expansion of the foaming agent within the plastic and no foaming is permitted at this time. Where the plastic is heated to the range of 300° F. to 400° F. and is charged with isobutane, the mold may be maintained at approximately 250 p.s.i. gage to preclude foaming as the liquid plastic is injected.

At this stage of the forming cycle, heated liquid is circulated through the passageways 11 and 17. This maintains the mold at an elevated temperature which may be approximately the same as the heated plastic when it is introduced into the mold. Therefore, the liquid in the passages 11 and 17 will be within the range of 300° F. to 400° F. in the example given. In order that the mold will be hot at the time the plastic enters the cavity, the heated fluid is introduced into passages 11 and 17 one or two seconds before the injection of the plastic takes place.

Various liquids may be utilized in the jackets around the exterior and interior of the mold. Water can be used in view of its obvious advantage of low cost. However, the vapor pressure of water is quite high at such temperatures so that it is necessary for the system to withstand considerable pressure to keep the water from flashing into steam. Other liquids will permit the system to operate under less pressure. Oil is one such fluid, although certain measures must be taken to preclude the formation of carbon deposits from the oil when pressurized by air and maintained at an elevated temperature. Ethylene glycol also may be used at a relatively low vapor pressure. The system need not be pressurized if a eutectic mixture of diphenyl nad diphenyl oxide is used, such a heat transfer liquid marketed by The Dow Chemical Company, Midland, Michigan, under the trademark "Dowtherm." Either type A or type E "Dowtherm" may be used, the latter being intended primarily for particularly high temperature use.

After the injection of the plastic is complete, the pressure in the mold cavity is suddenly relieved. This is accomplished by venting the line 28 to the atmosphere. This removes the opposing force on the surface of the liquid plastic within the mold, allowing it to expand as the foaming reaction now may take place. In view of the fact that the foaming commences within the mold rather than prior to introduction into the mold, the plastic will expand to fill all portions of the mold cavity. The use of a heated mold avoids any premature solidification of the expanding plastic material. A uniform product of smooth surface finish, equal densities and improved cell structure throughout will result.

As soon as the foaming has been completed and the plastic fills the cavity, the hot liquid in the passages 11 and 17 is replaced with a cooling liquid. This chills the mold thereby cooling the plastic in the cavity, solidifying or freezing it and completing the forming process. The temperature of the coolant depends upon the plastic being formed, the mold design, and the rate of production to be obtained, but in any event will be sufficiently low to effect solidification of the foamed plastic article. Then upon separation of the mold sections 2 and 3, the finished cup may be removed.

When the molds are cooled, the small amount of plastic remaining in injection tube 21 will be solidified along with the remainder of the plastic forced from cylinder 22. The plastic in mold cavity 4 will break away from the plastic in tube 21 when the mold sections are separated and the part is ejected. Annular groove 35 in tube 21 assists in retaining this solidified plastic plug in place. This plug of solid plastic seals off the cavity from cylinder 22 as the piston 24 is retracted to receive a new charge of plastic to be injected. When hot liquid subsequently is circulated through the passageway 11 in the next forming cycle, this plug of solid material again will be liquified and will mix with the fresh charge of plastic forced into the mold.

The step-by-step procedure in forming the part through the provisions of this invention is illustrated in FIGS. 4–8. FIG. 4 shows how the mold is initially heated by the circulation of hot water through the passageways 11 and 17 while the predetermined quantity of plastic in the cylinder 22 is heated and ready for introduction into the mold cavity. FIG. 5 illustrates the next step in which the piston 24 is advanced through its stroke, thereby injecting the liquid plastic into the base of the mold cavity. Air entering the cavity from the line 28 maintains the cavity under pressure at this time. Hot water continues to circulate through the passageways 11 and 17, so that the plastic is kept in a liquid condition, while air pressure contacting the exposed surface of the plastic in the cavity prevents its foaming. In FIG. 6, there can be seen the step of releasing the air pressure by venting the line 28, so that the plastic in the mold cavity is allowed to foam and completely fill the cavity. As this occurs, hot water is still circulated through the passageways 11 and 17. After the foaming is complete, the hot water in the passageways 11 and 17 is replaced by cold water for chilling the part and solidifying it, as seen in FIG. 7. After this, the completed part is released upon separation of the two sections of the mold, as illustrated in FIG. 8.

The arrangement by which the fluids are circulated through the mold may be seen by reference to the schematic illustration of FIG. 2. Located immediately adjacent the mold assembly 1 is a three-way valve 30. The outlet of this valve connects both to the inlet 13 to passageway 11 and the entrance 19 for the passageway 17. One portion of the valve inlet receives a conduit 31 for transmitting hot liquid. This line includes a suitable heat exchanger 32 to maintain the liquid at the proper temperature, as well as a pump 33 for circulating the liquid. The pump inlet is supplied from a reservoir 34.

A generally similar cold liquid system connects to the other inlet to the valve 30. Hence, the line 37 leading to valve 30 may include a heat exchanger 38 for maintaining the liquid at a proper reduced temperature whereby it can lower the temperature of the mold enough to solidify the plastic in the cavity 4. A pump 39 is supplied from a reservoir 40 that contains a supply of the cold liquid. Of course, the cold liquid will differ from the hot only as to its temperature, and will constitute the same substance as the hot liquid. Where the heat transfer liquid is pressurized, both the hot and cold branches of the system are maintained at the pressure.

Another three-way valve 42 is located next to the mold with its inlet being connected to the outlets 14 and 20 of the mold assembly 1. Conduit 43, connecting to valve 42, provides a return to the hot liquid reservoir 34. Also, line 44 connects to the valve 43 for returning cold liquid to the reservoir 40.

It can be seen, therefore that at the initial part of the cycle when the plastic is to be injected into the mold cavity, valve 30 is positioned so that fluid from line 31 is conducted into the mold passages 11 and 17. The outlet valve 42 is turned to connect line 43 to the mold outlets 14 and 20. In this relationship, which is illustrated in FIG. 2, the hot liquid may circulate through the mold for appropriately heating it as the unfoamed plastic is injected into the cavity.

Next, as the mold is to be cooled, the valves simply are repositioned so that the line 37 for the cooling liquid communicates with the mold passages while line 44 then acts as the return from the outlet valve 42. Valves 30 and 42 always are moved simultaneously.

With this arrangement, changeover from hot to cold liquid is accomplished rapidly. By locating valves 30 and 42 close to the mold assembly 1 it is possible to switch from the liquid at one temperature to that at the other almost instantaneously. There will be only a minor amount of intermixing of the hot and cold liquids, occurring immediately upon changeover from the liquid at one temperature to that at the other. This is necessary because the liquid remaining in the mold must be exhausted as the valves are repositioned. With the valves being adjacent the mold, this effect is slight, minimizing the load on the heat exchanger devices.

The pressurizing line 28 is controlled by a valve 46 which may receive air under pressure through a line 47 that connects to an accumulator 48, which is in turn supplied by compressor 49. A shut off valve 50 also is included in line 47 leading to the control valve 46. Therefore, just prior to the time the hot liquid plastic is injected into the mold cavity 4, valve 50 is opened, while valve 46 is positioned so that compressed air from lines 47 and 28 communicates with the upper end of the mold cavity. Then, when the foaming action is to take place, valve 46 is repositioned, venting the line 28 to the atmosphere. This accomplishes a sudden release of the pressure in the mold cavity so that the foaming may take place rapidly after the liquid plastic material has been forced into the mold.

For efficient mass production in accordance with this invention, the valves 30, 42 and 46 should be power operated and automatically controlled to provide the cycle described above. This may be accomplished, as illustrated in FIG. 2, by making these valves solenoid operated and connecting them through electrical conductors 52, 53, and 54 to a timer 55. A source of electrical energy connects to the timer by conductor 56. Hence, the timer may assure that valves 30 and 42 are positioned to circulate the hot liquid at the same time that line 28 connects to the source of compressed air. Then with the liquid still circulating, line 28 relieves the pressure, permitting the foaming action to take place within the mold. After a predetermined length of time in which it is known that the foaming will be complete, valves 30 and 42 are switched to pass the cooling liquid through the mold to terminate the forming cycle.

The action of the piston 24 likewise should be controlled automatically and correlated with the movement of the valves. One way of accomplishing this is to connect the rod 25 to a hydraulic cylinder 58 receiving pressurized fluid through line 59. A solenoid operated valve 61, connected by conductor 62 to the timer 55, controls the movement of the cylinder 58 and hence travel of piston 24 through its stroke. This makes it possible, therefore, to move the piston through its stroke at the proper time, only after the valve 46 has been positioned to pressurize the mold cavity and the valves 30 and 42 have been turned so that heating liquid passes through the passageways of the mold.

An additional air line 68 is connected to the mold cavity and used when separating a completed part. This line connects to the annular protuberance 69 at the top of the cavity. This shoulder provides a mechanical means of drawing the part out of the female portion of the cavity and bringing it with the male part of the mold when the mold sections are separated. At this time air under pressure is connected to line 68 thereby exerting a force at the shoulder 69. This air will slightly expand the part while exerting an axial force used in driving the part off of the male mold section, allowing it to drop to a conveyor for removal from the machine. It is not necessary to exert as much force in ejecting the part from the male mold section as when pressurizing the mold cavity at the time of the injection of the liquid plastic. While in the neighborhood of 250 p.s.i. may be necessary in the latter instance, around 60 p.s.i. is sufficient in removing the part. Therefore, there is provided a pressure reducer 63 in the line 68 which extends between valve 46 and the mold. The pressure reducer 63 serves to lower the air pressure appropriately at the shoulder 69. A shut off valve 64 also is included in the conduit 68. This may be a solenoid operated valve energized by conductor 65 that connects to the timer. Therefore, in driving the part from the male mold 3, the valve 46 is positioned so as to interconnect lines 47 and 68. With valve 64 open, pressurized air is conducted through the passageway 68 to the shoulder, creating the ejecting force mentioned above.

In order to conserve compressed air the line 68 is closed prior to the time that the high pressure compressed air from line 47 is brought into communication with the mold cavity. This is accomplished by shutting solenoid operated valve 64 in line 68. This valve is closed after a relatively short blast of air from line 47 has passed through valve 46 and line 68 to the shoulder 69.

In the plastic forming arrangement of this invention, it is particularly advantageous to utilize liquids rather than gases as the heating and cooling fluids for the mold. This is despite the fact that higher temperatures may be achieved by a vapor such as steam. Nevertheless, a more efficient heat transfer and a more rapid changeover from the fluid at one temperature to that at the other may be accomplished by the use of liquid in the heating system. For one thing, a hot vapor such as steam is subject to condensation as it enters the mold passages. This situation is aggravated by the fact that the mold must be cooled prior to the heating cycle and the steam will contact wall surfaces at a considerably lower temperature. The steam will not efficiently transmit heat to the mold wall until it entirely fills the passageway. If it is condensing as it enters the passageway it then requires a considerable period of time for the passageway to become filled. Therefore, heating of the mold may not occur for an appreciable interval when steam is utilized as the heating fluid. This adds to the time necessary in producing the item in the mold, and hence increases its cost. Also, when condensation occurs, there is a problem of removing the condensate and keeping the steam properly dry. Another factor with regard to the use of vapor is that its film coefficient is much lower than that of a liquid used as a heat transfer medium. Even though the vapor may have quite a high temperature, it may not transmit as much heat through the mold wall as a liquid at a lower temperature. Therefore, the liquid system of this invention offers distinct superiority over the steam heating arrangements normally employed in heated molds, and faster heating than any but those using fully dry steam.

Alternative to the use of the extruder 27 as in the previously described embodiment, the liquid plastic may be furnished to the mold by means of the arrangement illustrated in FIG. 3. Pressure vessel 71 is of double walled construction including an inner shell 72 and an outer jacket 73. The interior of the unit is sealed off by the lid 74. The jacket 73 forms a passage for heated fluids such as steam utilized in maintaining the vessel 71 at an elevated temperature. Hence, there may be included a steam inlet line 75 connecting to a jacket 73 as well as a steam return line 76. Plastic is introduced into the interior of the vessel 71 by means of a conduit 78 entering the lid 74. A suitable reservoir or hopper 79 provides the source of the plastic which may be either in liquid or granular form. The flow of the plastic into the vessel 71 is controlled by valve 80.

The gas for charging the plastic with the foaming agent enters the vessel 71 through conduit 82 that also connects to the lid 74. The gas is contained in storage tank element 83 and the flow into the container is controlled by valve 84.

Therefore, appropriate amounts of the plastic and gas may be brought into the container 71 which is sealed and maintained under pressure sufficient to prevent foaming. This will be around 200 to 300 p.s.i. At this time an agitator 85, rotated by shaft 86 that in turn is driven by motor 87, serves to thoroughly mix the plastic and the foaming agent.

At the bottom of the container 71 the properly mixed plastic and foaming agent may be forced downwardly by the pressure in vessel 71 through conduit 88 and its check valve 89 into an injection cylinder. The latter element may be the cylinder 22 previously described, located immediately adjacent the mold. Otherwise, the construction shown in FIG. 3 may be used, which includes a cylinder 90 similar to cylinder 22. A piston 91 is in the cylinder and when driven by rod 92 will force the liquid plastic out of the cylinder into line 93. As before the cylinder 90 may be of predetermined volume so that a metered amount of plastic material will be ejected in this manner. Check valve 94 is included in the line 93.

This type of arrangement allows the source of plastic and injection cylinder to be located some distance from the mold. Hence, the conduit 93 may extend any desired distance to the mold cavity where it connects through a suitable inlet such as the tube 21 previously described. The conduit 93 is maintained at an elevated temperature to keep the plastic in the tube in a liquified condition. Therefore, a suitable heating arrangement such as an electrical resistance heater 95 extends around the length of the tube 94.

In operation, therefore, each stroke of the piston 92 will inject a proper quantity of liquid plastic into the mold cavity 4. The plastic entering the conduit 93 adjacent the cylinder 90 will displace an equal amount of the liquid material adjacent the mold 1. Hence, the tube 93 continually receives a supply of plastic from one end while transmitting an equal amount at the other to the mold cavity 4 upon each stroke of the piston.

It may be seen from the foregoing, therefore, that we have provided an improved forming arrangement permitting thin-walled articles to be foamed within a mold cavity in such a manner that they will be of a uniform density and fill all the crevices within the cavity. This avoids the much more costly use of fused pelletized material, and assures a superior product that will be fluid tight in all instances. It is a simple matter to impart color to the product, which could not be accomplished with the use of plastic pellets. Perhaps even more important, the articles produced in accordance with this invention have a smooth uniform glass-like surface finish as contrasted with a much rougher surface when the construction is of fused foam pellets. Furthermore, this arrangement is particularly adapted to mass production techniques and may turn out thin-walled articles such as cups on an automatic basis. Despite this, the machinery necessary may be much less complicated than required for forming with fused foam pellet material.

The foregoing detailed description is to be clearly understood as given by way of illustration and example

We claim:

1. The method of forming a thin walled unitary foam plastic article comprising the steps of
liquifying a foamable plastic material by heating said plastic,
introducing said heated plastic into a confined volume greater than the volume of said heated plastic and capable of being filled by said plastic upon foaming thereof, said confined volume defining the contour of an article to be produced, providing a pressurized fluid in said confined volume so as to contact all parts of the surface of said heated plastic exposed therein, said fluid being at a pressure such that it maintains said heated plastic under fluid pressure sufficient to preclude the foaming thereof while said plastic is so introduced into said confined volume,
then releasing said fluid pressure after said plastic has been introduced into said confined volume and allowing said heated plastic to foam within said confined volume to fill the same,
and then cooling said plastic to solidify the same and result in a foam plastic article having the contour of said confined volume.

2. The method of forming a thin-walled foam plastic article comprising the steps of
providing a mold having a cavity therein, heating said cavity, injecting into said cavity a heated foamable plastic, of smaller volume than the volume of said cavity and of a quantity sufficient to fill said cavity upon the foaming of said plastic simultaneously with said injection providing a pressurized fluid in said cavity for contacting the surface of the foamable plastic injected therein and exerting a fluid pressure against the surface of the foamable plastic so injected sufficient to prevent the foaming of said foamable plastic,
then releasing said fluid pressure for permitting said foamable plastic to foam and entirely fill said cavity,
and then cooling said mold to cool the foamed plastic in said cavity and solidify the same.

3. The method of forming a thin-walled foamed plastic article comprising the steps of
providing a mold having a cavity therein,
heating said mold at said cavity,
introducing into said mold with said cavity so heated a quantity of foamable plastic material heated to a temperature sufficient to liquefy said plastic, said quantity of plastic material having a smaller volume than the volume of said cavity, and being of sufficient volume to fill said cavity upon foaming of said plastic material,
simultaneously with said introduction of said material providing a pressurized fluid in said cavity for contacting all exposed portions of the surface of said plastic material so introduced and exerting a fluid pressure against the surface of said material in said cavity, said pressurized fluid being at a pressure sufficient to prevent said material from foaming,
then releasing said fluid pressure for allowing said material to foam and entirely fill said cavity,
and then cooling said mold at said cavity for solidifying said material so foamed.

4. The method as recited in claim 3 in which for heating said mold a hot liquid is circulated adjacent said cavity, and in which for cooling said mold a relatively cooler liquid is circulated adjacent said cavity.

5. The method of forming a thin-walled foam plastic article comprising the steps of
providing a mold having a cavity therein complementary to a thin-walled article to be produced,
circulating a heated liquid adjacent said cavity to raise the temperature of said mold to a value sufficient to maintain in a liquefied condition a foamable plastic to be formed into a thin-walled article,
providing a quantity of said plastic sufficient when foamed to entirely fill said cavity,
heating said quantity of said plastic substantially to said temperature
while simultaneously maintaining said quantity of said plastic at a pressure sufficient to prevent foaming thereof,
introducing said heated plastic into said mold while said heated liquid is so circulated,
simultaneously with the introduction of said plastic providing a pressurized fluid in said cavity for contacting all portions of the surface of said heated plastic exposed in said cavity, said pressurized fluid being at a pressure such that it exerts a fluid pressure sufficient to prevent foaming of said plastic, then reducing the pressure of said fluid in said cavity for releasing said pressure on the surface of said plastic in said cavity to cause said plastic to foam and entirely fill said cavity,
and then circultaing a cooling liquid adjacent said cavity for reducing the temperature of and solidifying said plastic so foamed for thereby completing said thin-walled foam plastic article.

6. A device for forming a foamed plastic article comprising
a mold having a cavity therein,
means for injecting a predetermined quantity of unfoamed foamable plastic into said cavity, said predetermined quantity being of smaller volume than the volume of said cavity, and sufficient to fill said cavity upon the foaming thereof,
means for exerting a fluid pressure in said cavity at the time of said injection said last-mentioned means including means for introducing fluid into said cavity to engage all surfaces of said plastic exposed within said cavity, said fluid being at a pressure sufficient to prevent the foaming of said plastic,
means for releasing said fluid pressure for allowing said plastic to foam and fill said cavity, means for heating said mold during said injection of said plastic into said cavity and during the foaming of said plastic, and means for cooling said mold for solidifying said plastic subsequent to said foaming.

7. A device for forming a unitary thin walled plastic article comprising
a male mold member,
and a female mold member,
said mold members cooperating to define a sealed cavity defining the contour of an article to be produced,
means for introducing a predetermined quantity of foamable plastic into said cavity, said predetermined quantity being of smaller volume than the volume of said cavity, and sufficient to fill said cavity upon the foaming thereof,
means for exerting a fluid pressure against all exposed portions of the surface of the plastic so introduced by providing in said cavity a fluid under pressure to contact said exposed portions of said plastic, with said fluid being at a pressure sufficient to preclude foaming of said plastic during the introduction of said plastic,
means for releasing said fluid pressure to allow said plastic to foam in said cavity to fill the same, means for heating said mold during the introduction of said plastic into said cavity and during the foaming of said plastic, and means for cooling said mold for solidifying said plastic subsequent to said foaming.

8. A device for forming a foamed plastic article comprising
a mold having a cavity,
means communicating with said mold for injecting into said cavity a predetermined quantity of foamable plastic, said quantity being of smaller volume of said cavity, and sufficient to fill said cavity upon foaming thereof, means for introducing a pressurized fluid into said cavity at a pressure sufficient to prevent foaming of said plastic for exerting a fluid pressure in said mold against all portions of the surface of foamable plastic so introduced which are exposed to the interior of said cavity for preventing the foaming of said plastic, means for releasing said fluid pressure for permitting said plastic to foam for filling said cavity, means for heating said mold during the time said plastic is introduced in said cavity and is foaming therein, and means for cooling said mold after said foaming is complete for solidifying the plastic in said cavity.

9. A device as recited in claim 8 in which said means for introducing a predetermined quantity of liquid foamable plastic into said cavity comprises a cylinder of predetermined volume,
one end of said cylinder communicating with said cavity,
an inlet means for said cylinder for receiving liquid foamable plastic and filling said cylinder,
and a piston in said cylinder movable through a stroke therein for forcing liquid foamable plastic from said cylinder into said cavity.

10. A device for forming a unitary thin walled plastic article comprising a male mold member,
and a female mold member,
said mold members cooperating to define a sealed cavity of fixed volume defining the contour of an article to be produced, means for introducing into said cavity a predetermined quantity of heated foamable plastic at a temperature sufficient to liquify said plastic, said quantity being of smaller volume than said fixed volume of said cavity, and sufficient to fill said cavity upon foaming of said plastic, means for heating said mold substantially to said temperature when said plastic is so introduced, means connected with said cavity for introducing into said cavity a fluid under pressure for contacting the surface of said plastic exposed within said cavity and exerting a fluid pressure against the surface of said plastic during the introduction thereof into said mold, said pressure being sufficient to prevent the foaming thereof, means for subsequently releasing said pressure for permitting said plastic to foam in said cavity and fill the same, and means for then cooling said mold for solidifying the plastic foamed in said cavity.

11. A device as recited in claim 10 in which said means for heating said mold includes means for circulating a heated liquid around said mold,
and said means for cooling said mold includes means for circulating a relatively cooler liquid around said mold.

12. A device for forming a thin-walled foamed plastic article comprising a mold having a cavity,
means communicating with one portion of said cavity for injecting a predetermined quantity of liquid unfoamed foamable plastic therein, said predetermined quantity being of smaller volume than the volume of said cavity, and sufficient to fill said cavity upon foaming of said plastic,
means communicating with another portion of said cavity for introducing pressurized air into said cavity to contact all portions of the surface exposed to the interior of said cavity of a plastic so injected, said pressurized air being at a pressure sufficient to preclude the foaming of said plastic,
means for exhausting said pressurized air from said cavity for permitting said plastic to foam within said cavity for filling the same,
means for circulating a relatively hot fluid around said cavity for heating said mold when said liquid foam plastic is introduced therein and permitted to foam within said cavity,
and means for circulating a relatively cooler fluid around said cavity for conducting heat away from said mold and solidifying said foamed plastic.

13. A device as recited in claim 12 in which said relatively hot and relatively cooler fluids are in a liquid state.

14. A device for forming a cup comprising a mold,
said mold having a male portion and a female portion cooperating to define a cavity of substantially fixed volume having side walls and a bottom wall,
said mold portions being separable,
a passageway in said male portion of said mold adjacent said cavity for conducting a liquid therethrough,
a passageway in said female portion of said mold adjacent said cavity for conducting a liquid therethrough,
a source of heated liquid connected to said passageways for conducting said heated liquid therethrough,
a source of a relatively cooler liquid connected to said passageways for conducting said cooler liquid therethrough,
a first conduit entering said mold cavity from the exterior thereof,
means for forcing a predetermined quantity of liquid foamable plastic material through said conduit, said predetermined quantity being of smaller volume than said substantially fixed volume of said cavity, and sufficient to fill said cavity upon foaming of said plastic,
a second conduit communicating with said mold cavity at a location remote from said first conduit,
means for conducting a fluid at a relatively high pressure through said second conduit to said cavity for contacting all portions of the surface of said plastic exposed to the interior of said mold cavity, said fluid being at a pressure sufficient for preventing said plastic in said mold cavity from foaming,
means for releasing said source of pressure at said second conduit for permitting said plastic to foam, and control means for causing said conduction of heated liquid during the forcing of said predetermined quantity of liquid plastic material through said conduit, and conduction of heated liquid subsequent to the release of said source of pressure at said second conduit for thereby maintaining said mold in a heated condition during the foaming of said plastic, said control means including means for causing the conduction of said relatively cooler liquid through said passageways following said conduction of heated liquid for thereby cooling and solidifying a part in said cavity.

15. A device as recited in claim 14 in which said first conduit communicates with said bottom wall portion of said mold,
and said second conduit communicates with side wall portions of said mold.

16. A device as recited in claim 14 in which said side wall of said mold cavity includes an annular protuberance defining a shoulder,
said second conduit communicating with said cavity at said shoulder,
said fluid pressure means including means for exerting a relatively lower pressure upon separation of said male portion of said mold from said female portion of said mold for thereby providing a fluid reaction at said shoulder and separating a completed plastic article from said male portion of said mold.

References Cited by the Examiner
UNITED STATES PATENTS

| | | | |
|---|---|---|---|
| 2,283,316 | 5/1942 | Cooper et al. | 264—55 X |
| 2,751,627 | 6/1956 | Lindemann | 264—55 X |
| 2,831,214 | 4/1958 | Eyles et al. | |
| 3,029,472 | 4/1962 | Fischer | 264—52 |
| 3,058,161 | 10/1962 | Beyer et al. | 264—47 |
| 3,160,689 | 12/1962 | Brunner | 264—54 |
| 3,162,703 | 12/1964 | Eyles | 264—51 |
| 3,211,605 | 10/1965 | Spaak et al. | 264—51 X |
| 3,218,375 | 11/1965 | Hardwick | 264—51 X |

OTHER REFERENCES

Modern Plastics, "New Techniques for Processing Expandable Styrene Foam: Injection Molding," September 1960, pp. 113, 115 and 202.

Plastics World, "Injection Molding Expandable Polystyrene Beads," January 1962, pp. 18–21.

ALEXANDER H. BRODMERKEL, *Primary Examiner.*

P. E. ANDERSON, *Assistant Examiner.*

UNITED STATES PATENT OFFICE
CERTIFICATE OF CORRECTION

Patent No. 3,268,635                                      August 23, 1966

Robert A. Kraus et al.

It is hereby certified that error appears in the above numbered patent requiring correction and that the said Letters Patent should read as corrected below.

Column 11, line 1, after "volume" insert -- than the volume --.

Signed and sealed this 5th day of September 1967.

(SEAL)

Attest:

ERNEST W. SWIDER  
Attesting Officer

EDWARD J. BRENNER  
Commissioner of Patents